(12) United States Patent
Nowlin et al.

(10) Patent No.: US 7,570,937 B2
(45) Date of Patent: Aug. 4, 2009

(54) COMFORT NOISE GENERATOR

(75) Inventors: Robert Winston Nowlin, Mesa, AZ (US); Seth Suppappola, Tempe, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 1120 days.

(21) Appl. No.: 10/645,360

(22) Filed: Aug. 21, 2003

(65) Prior Publication Data

US 2005/0041798 A1    Feb. 24, 2005

(51) Int. Cl.
*H04B 1/16* (2006.01)

(52) U.S. Cl. .................. 455/339; 455/334; 455/570

(58) Field of Classification Search ............ 455/569.1, 455/570, 307, 334, 296, 67.11–67.14; 704/226–228; 375/285; 379/406
See application file for complete search history.

(56) References Cited

U.S. PATENT DOCUMENTS

| 5,630,016 | A  | * | 5/1997 | Swaminathan et al. | 704/228 |
| 5,960,389 | A  | * | 9/1999 | Jarvinen et al. | 704/220 |
| 6,625,284 | B1 | * | 9/2003 | Ariyama | 381/66 |
| 6,708,024 | B1 | * | 3/2004 | Yip | 455/226.4 |
| 2003/0063662 | A1 | * | 4/2003 | Uchino et al. | 375/226 |
| 2003/0123535 | A1 | * | 7/2003 | Nayak | 375/229 |

OTHER PUBLICATIONS

Gandhi et al.,*A New Approach to the Design of Two-Channel Perfect Reconstruction Filter Banks*, 0-7803_5008-1/98; © 1998 IEEE, pp. 405-408.
Gandhi et al.,*A Computationally Efficient Design of Two-Band QMF Banks Based on the Frequency Sampling Approach*, 0-7803-4455-3/98, © 1998 IEEE, pp. V-421-424.
Gandhi et al.,*Design of Two-Channel Low Delay Perfect Reconstruction Filter Banks*, 0-7803-5148-7/98, © 1998 IEEE, pp. 1655-1659.
*Digital Signal Processing*, "Quadrature Mirror Filter", EECE UBC, pp. 46-56.

* cited by examiner

*Primary Examiner*—Lana N Le
(74) *Attorney, Agent, or Firm*—Paul F. Wille

(57) ABSTRACT

Comfort noise is derived from a white noise signal by filtering the white noise signal in a QMF bank to produce comfort noise signal that is selectively coupled to at least one channel in a telephone. Preferably, a plurality of QMF banks are used and the magnitude of the white noise into each filter is controlled in accordance with the magnitude of the signal in a corresponding analysis sub-band in a channel. In accordance with another aspect of the invention, the signals from higher frequency analysis sub-bands are combined and control a single input to a QMF bank, thereby increasing the low frequency resolution of the comfort noise. In accordance with another aspect of the invention, the QMF banks are cascaded upwardly (the output of one bank is coupled to the low pass input of the next bank), which also enhances the low frequency resolution of the comfort noise.

10 Claims, 4 Drawing Sheets

COMFORT NOISE GENERATOR

BACKGROUND OF THE INVENTION

This invention relates to a noise generator for use in telephones and other communication devices wherein it is desired to avoid complete silence during a communication.

As used herein, "telephone" is a generic term for a communication device that utilizes, directly or indirectly, a dial tone from a licensed service provider. As such, "telephone" includes desk telephones, cordless telephones, speaker phones (see FIG. 1), hands free kits (see FIG. 2), and cellular telephones (see FIG. 3), among others. For the sake of simplicity, the invention is described in the context of telephones but has utility in any communication device that silences a channel temporarily.

Anyone who has used a speaker phone, for example, is well aware of the cut off speech and the silent periods during a conversation caused by echo canceling circuitry within the speaker phone. Such phones generally operate in what is known as half-duplex mode, which means that only one person can speak at a time. While such silent periods assure that sound from the speaker phone is not coupled directly into the microphone within the speaker phone, the quality of the call is poor.

Telephones of the prior art often impose a silence in an attempt to eliminate acoustic and electronic echoes. When speech is gated off by a center clipper, attenuated by a residual echo suppresser, or canceled by a noise cancellation system, the resulting output is unnaturally quiet. The silence has been interpreted by consumers as a broken connection and a party to a call might mistakenly hang up. This problem has been solved by providing so-called "comfort noise" in which a low level noise signal is applied to a line rather than silence. U.S. Pat. No. 6,122,611 (Su et al.) describes a system that not only adds noise during periods of silence but also adds a little noise during conversation to avoid changes in the apparent loudness of the speech.

While one might think that all noise is the same, such is not the case. An automobile produces quite a different background noise from an office or a living room full of people. Adding "white" (spectrally flat random) noise produces yet another background sound. U.S. Pat. No. 5,657,422 (Janiszewski et al.) discloses filtering the noise in a low pass filter to make it sound more natural. While better than white noise, it remains a problem to provide a comfort noise that resembles the actual noise in each individual telephone call.

In view of the foregoing, it is therefore an object of the invention to provide an improved generator of comfort noise.

Another object of the invention is to provide comfort noise that more closely matches the spectral content of actual noise during a call.

A further object of the invention is to provide a comfort noise that matches actual background noise as closely as possible by shaping white noise using a quadrature mirror filter bank.

SUMMARY OF THE INVENTION

The foregoing objects are achieved in this invention in which comfort noise is derived from a white noise signal by filtering the white noise signal in a quadrature mirror filter (QMF) bank that uses a polyphase filter structure to produce a comfort noise signal that is selectively coupled to at least one channel in a telephone. Preferably, an M (M>2) channel quadrature mirror filter bank with a plurality of polyphase filters is used and the magnitude of the white noise into each filter is controlled in accordance with the magnitude of the signal in a corresponding sub-band in a channel. In accordance with another aspect of the invention, the signals from higher frequency sub-bands are combined and control a single input to a QMF bank, thereby increasing the low frequency content of the comfort noise. In accordance with another aspect of the invention, the QMF banks are cascaded upwardly (the output of one bank is coupled to the low pass input of the next bank), which provides finer spectral resolution at low frequencies.

BRIEF DESCRIPTION OF THE DRAWINGS

A more complete understanding of the invention can be obtained by considering the following detailed description in conjunction with the accompanying drawings, in which.

Those of skill in the art recognize that, once an analog signal is converted to digital form, all subsequent operations can take place in one or more suitably programmed microprocessors. Reference to "signal", for example, does not necessarily mean a hardware implementation or an analog signal. Data in memory, even a single bit, can be a signal. In other words, a block diagram herein can be interpreted as hardware, software, e.g. a flow chart, or a mixture of hardware and software. Programming a microprocessor is well within the ability of those of ordinary skill in the art, either individually or in groups.

DETAILED DESCRIPTION OF THE INVENTION

Figure 1:
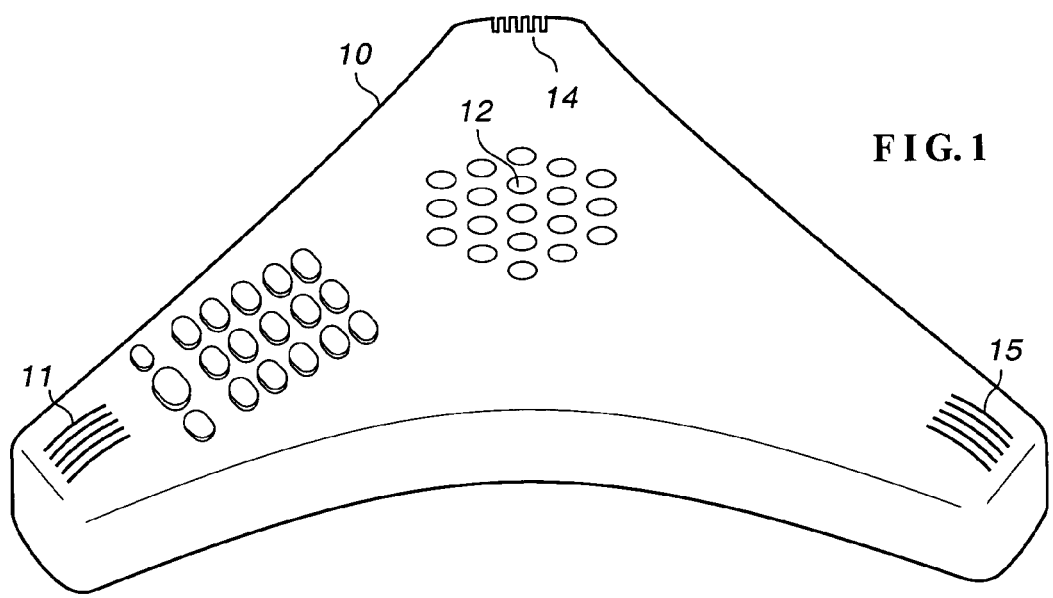
FIG. 1 is a perspective view of a conference phone or a speaker phone.

This invention finds use in many applications where the electronics is essentially the same but the external appearance of the device may vary. FIG. 1 illustrates a conference phone or speaker phone such as found in business offices. Telephone 10 includes microphone 11 and speaker 12 in a sculptured case. Telephone 10 may include several microphones, such as microphones 14 and 15 to improve voice reception or to provide several inputs for echo rejection or noise rejection, as disclosed in U.S. Pat. No. 5,138,651 (Sudo). Acoustic echo can occur when sound from speaker 12 is coupled to one of the microphones. Background noise can be considerable in a speaker phone because the user is typically a meter or more away from a microphone.

Figure 2:
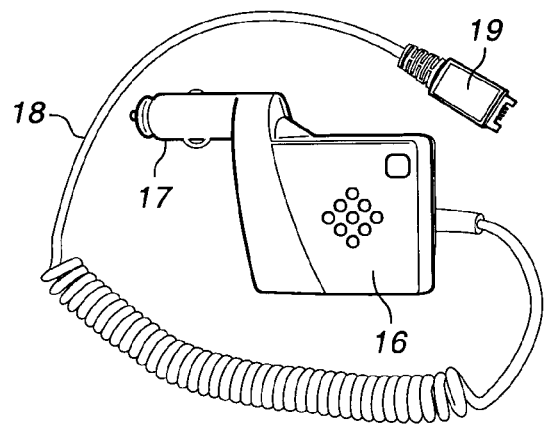
FIG. 2 is a perspective view of a hands free kit.
Figure 3:
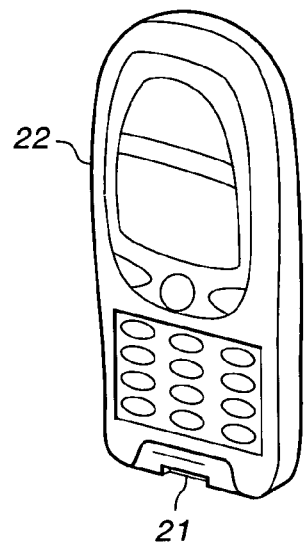
FIG. 3 is a perspective view of a cellular telephone.

FIG. 2 illustrates what is known as a hands free kit for providing audio coupling to a cellular telephone, illustrated in FIG. 3. Hands free kits come in a variety of implementations but generally include powered speaker 16 attached to plug 17, which fits an accessory outlet or a cigarette lighter socket in a vehicle. A hands free kit also includes cable 18 terminating in plug 19. Plug 19 fits the headset socket on a cellular telephone, such as socket 21 (FIG. 3) in cellular telephone 22.

Some kits use RF signals, like a cordless phone, to couple to a telephone. A hands free kit also typically includes a volume control and some control switches, e.g. for going "off hook" to answer a call. A hands free kit also typically includes a visor microphone (not shown) that plugs into the kit. Background noise in a vehicle can also be considerable but distinctly different from the background noise in a speaker phone.

Figure 4:
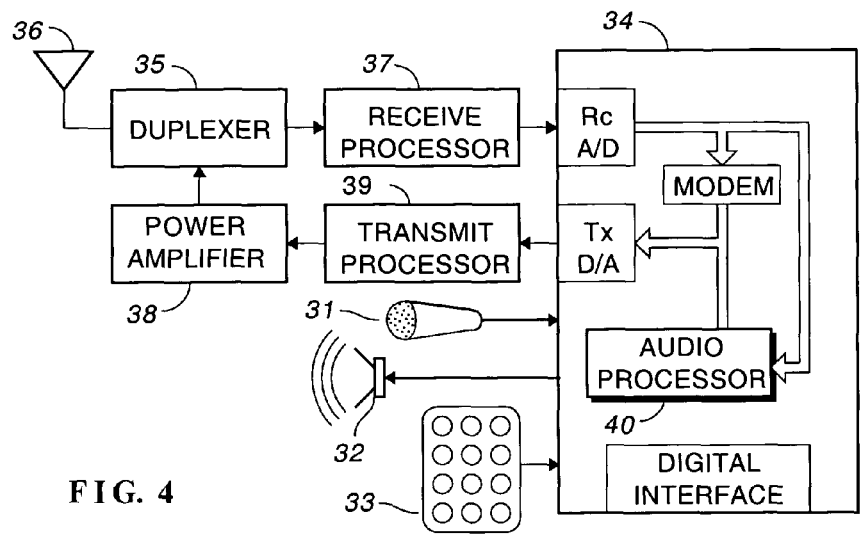
FIG. 4 is a generic block diagram of audio processing circuitry in a telephone.

The various forms of telephone can all benefit from the invention. FIG. 4 is a block diagram of the major components of a cellular telephone. Typically, the blocks correspond to integrated circuits implementing the indicated function. Microphone 31, speaker 32, and keypad 33 are coupled to signal processing circuit 34. Circuit 34 performs a plurality of functions and is known by several names in the art, differing by manufacturer. For example, Infineon calls circuit 34 a "single chip baseband IC." QualComm calls circuit 34 a "mobile station modem." The circuits from different manufacturers obviously differ in detail but, in general, the indicated functions are included.

A cellular telephone includes both audio frequency and radio frequency circuits. Duplexer 35 couples antenna 36 to receive processor 37. Duplexer 35 couples antenna 36 to power amplifier 38 and isolates receive processor 37 from the power amplifier during transmission. Transmit processor 39 modulates a radio frequency signal with an audio signal from circuit 34. In non-cellular applications, such as speakerphones, there are no radio frequency circuits and signal processor 34 may be simplified somewhat. Problems of echo cancellation and noise remain and are handled in audio processor 40. It is audio processor 40 that is modified to include the invention. How that modification takes place is more easily understood by considering an audio processor in more detail.

Figure 5:
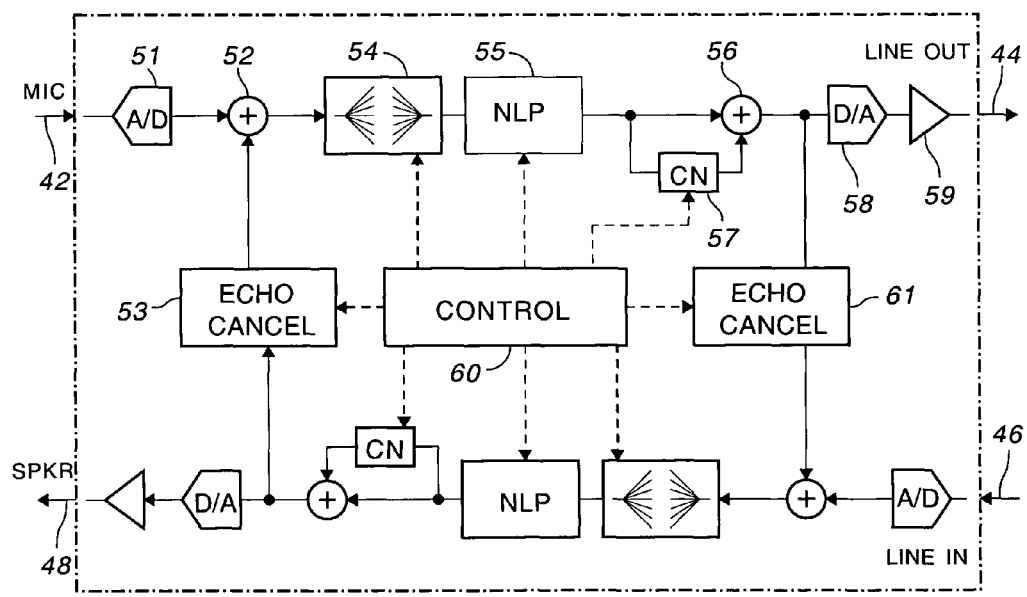
FIG. 5 is a more detailed block diagram of audio processing circuitry in a telephone.

FIG. 5 is a detailed block diagram of an audio processing circuit, including a noise reduction circuit and an echo canceling circuit, loosely based on chapter 6 of *Digital Signal Processing in Telecommunications* by Shenoi, Prentice-Hall, 1995. Sub-band filter bank 54 is not shown in the text. The following describes signal flow through the transmit channel, from microphone input 42 to line output 44. The receive channel, from line input 46 to speaker output 48, works in the same way.

Sound is converted into an electrical signal by a microphone (not shown in FIG. 5) and the electrical signal is coupled to microphone input 42. The sound may or may not include sound from a speaker (not shown in FIG. 5) driven by the signal at speaker output 48. The signal at input 42 is digitized in A/D converter 51 and coupled to summation network 52. There is, as yet, no signal from echo canceling circuit 53 and the signal proceeds to sub-band filter block 54, which is initially set to minimum attenuation. In sub-band filter block 54, the transmit channel is divided by frequency into a plurality of sub-bands. In a preferred embodiment of the invention, ten sub-bands are used. As few as two sub-bands can be used.

The signals from at least some the sub-bands are combined and coupled through non-linear processor 55 to summation circuit 56, where comfort noise from generator 57 can be added to the signal. Non-linear processor 55 includes, for example, a center clipper, as noted above. A center clipper fully attenuates low level signals producing the silence described above. The output signal from summation circuit 56 is converted into analog form by D/A converter 58, amplified in amplifier 59, and coupled to line output 44.

Control circuit 60, which includes signal inputs (not shown) from several points in the audio processing circuit, controls sub-band selection and attenuation, non-linear processing, comfort noise insertion, and echo cancellation. Echo canceller 53 reduces acoustic echo between speaker output 48 to microphone input 42. Echo canceller 61 reduces line echo between line output 44 and line input 46.

Figure 6:
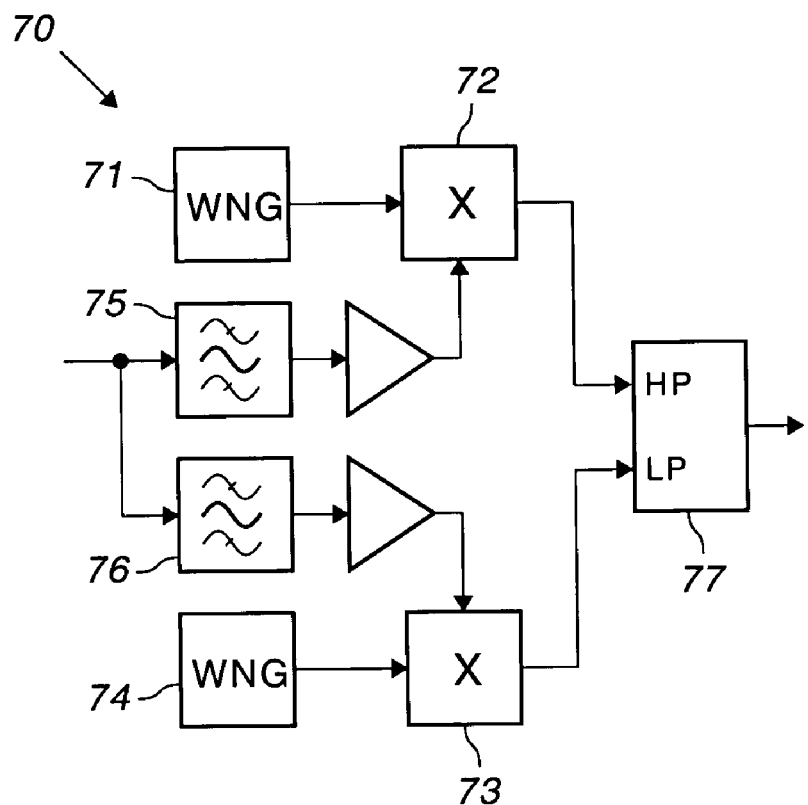
FIG. 6 is a simplified block diagram illustrating the operation of a comfort noise generator constructed in accordance with the invention.

In the prior art, comfort noise is simply generated and added, as in the Su et al. patent, or white noise is filtered (in a low pass filter) as in the Janiszewski et al. patent. Unlike the prior art, the comfort noise generated in accordance with the invention mimics the power distribution of actual noise during a call, thereby producing a much more realistic background noise. FIG. 6 illustrates the basic operation of the invention.

In FIG. 6, comfort noise generator 70 includes white noise generator 71 coupled through multiplier 72 to the high pass input of quadrature mirror filter bank 77. White noise generator 74 is coupled through multiplier 73 to the low pass input of QMF bank 77. The gain of each channel is controlled in accordance with the amplitude of the signals in the sub-bands defined by sub-band filter 75 and sub-band filter 76. Filters 75 and 76 are preferably band pass filters, in which the center frequency of filter 75 is higher than the center frequency of filter 76. By controlling gain in accordance with the amplitude, or power, in the sub-bands, one obtains a better representation of the actual noise. That is, the amplitude of each white noise signal is adjusted in accordance with the power in each sub-band.

White noise generators 71 and 74 are each preferably a sixteen bit white noise generator synthesizing uniformly distributed random data in the interval (−1, 1). In accordance with another aspect of the invention, a different seed (starting value) is used in each white noise generator to provide a higher degree of randomness in the channels.

Figure 7:
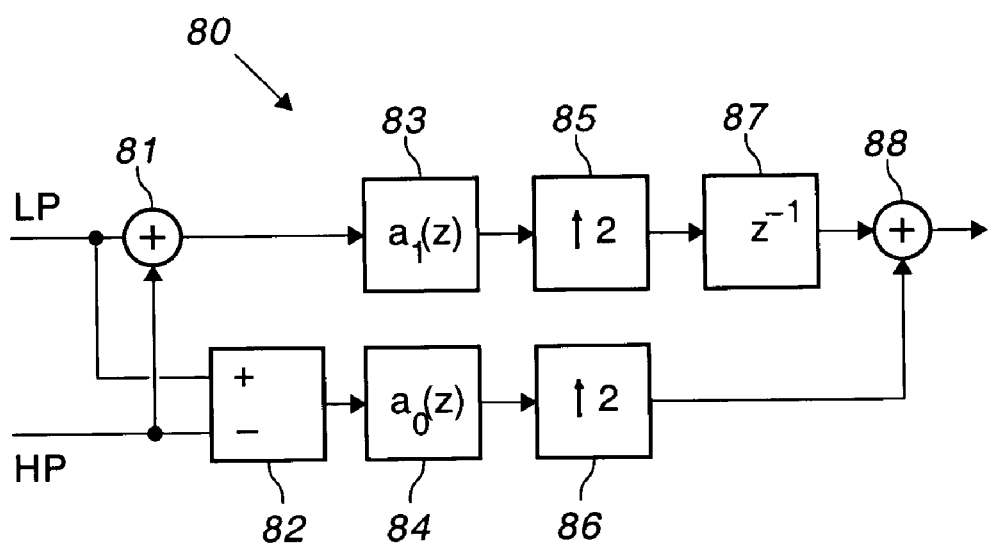
FIG. 7 is a block diagram of a polyphase filter used in implementing the invention.

Filter 77 uses a polyphase filter structure to implement the QMF bank. FIG. 7 is a block diagram of a preferred embodiment of the polyphase filter structure 80 for use in the invention.

Filter 80 includes a low pass input coupled to summation circuit 81 and to subtractor 82. A high pass input is also coupled to summation circuit 81 and to subtractor 82. The input signals are added in summation circuit 81 and coupled to all pass filter 83. The input signals are subtracted in subtractor 82 and coupled to all pass filter 84. The output from filter 83 is up-sampled in block 85 and delayed one sample time in block 87. The output from filter 84 is up-sampled in block 86 and added to the delayed signal in summation circuit 88.

The derivation of filters 83 and 84 is described as follows. A low pass, third order elliptical filter was designed to have 1 dB ripple in the pass band, 40 dB ripple in the stop band, and a stop band frequency of 0.25 cycles per sample. These specification yielded the following low pass filter.

$$H_0(z) = \frac{0.15894 + 0.40296 z^{-1} + 0.40296 z^{-2} + 0.15984 z^{-3}}{1 - 0.30823 z^{-1} + 0.62909 z^{-2} - 0.19706 z^{-3}}$$

The following equations are used to derive the polyphase components.

$$a_0(z^2) = H_0(z) + H_1(z) \quad [1]$$

and $$a_1(z^2) = H_0(z) - H_1(z) \quad [2]$$

where $$H_1(z) = H_0(-z)$$

and $H_1(z)$ is a high pass filter. Solving these equations for $a_0(z^2)$ and $a_1(z^2)$ yields the following polyphase filters.

$$a_0(z^2) = \frac{0.15894 + 0.62715z^{-2} + 0.38190z^{-4} + 0.03132z^{-6}}{1 + 1.16320z^{-2} + 0.27422z^{-4} - 0.03883z^{-6}}$$

$$a_1(z^2) = \frac{0.45195 + 0.56796z^{-2} + 0.17939z^{-4}}{1 + 1.16320z^{-2} + 0.27422z^{-4} - 0.03883z^{-6}}$$

Equations [1] and [2] correspond to equation 3.6.14 in P. P. Vaidyanathan, *Multirate Systems and Filter Banks*, p. 87, Prentice-Hall, Upper Saddle River, N.J., 1993. FIG. 7 implements the function represented by equations [1] and [2].

Each of the filters represented by $a_0(z)$ and $a_1(z)$ are further divided into second order sections and implemented using the Direct Form I method. Direct Form I minimizes the effect of coefficient quantization noise by allowing both numerator and denominator coefficients to be multiplied and accumulated before rounding is performed. This method is more robust to quantization problems in typical fixed point implications.

Figure 8:
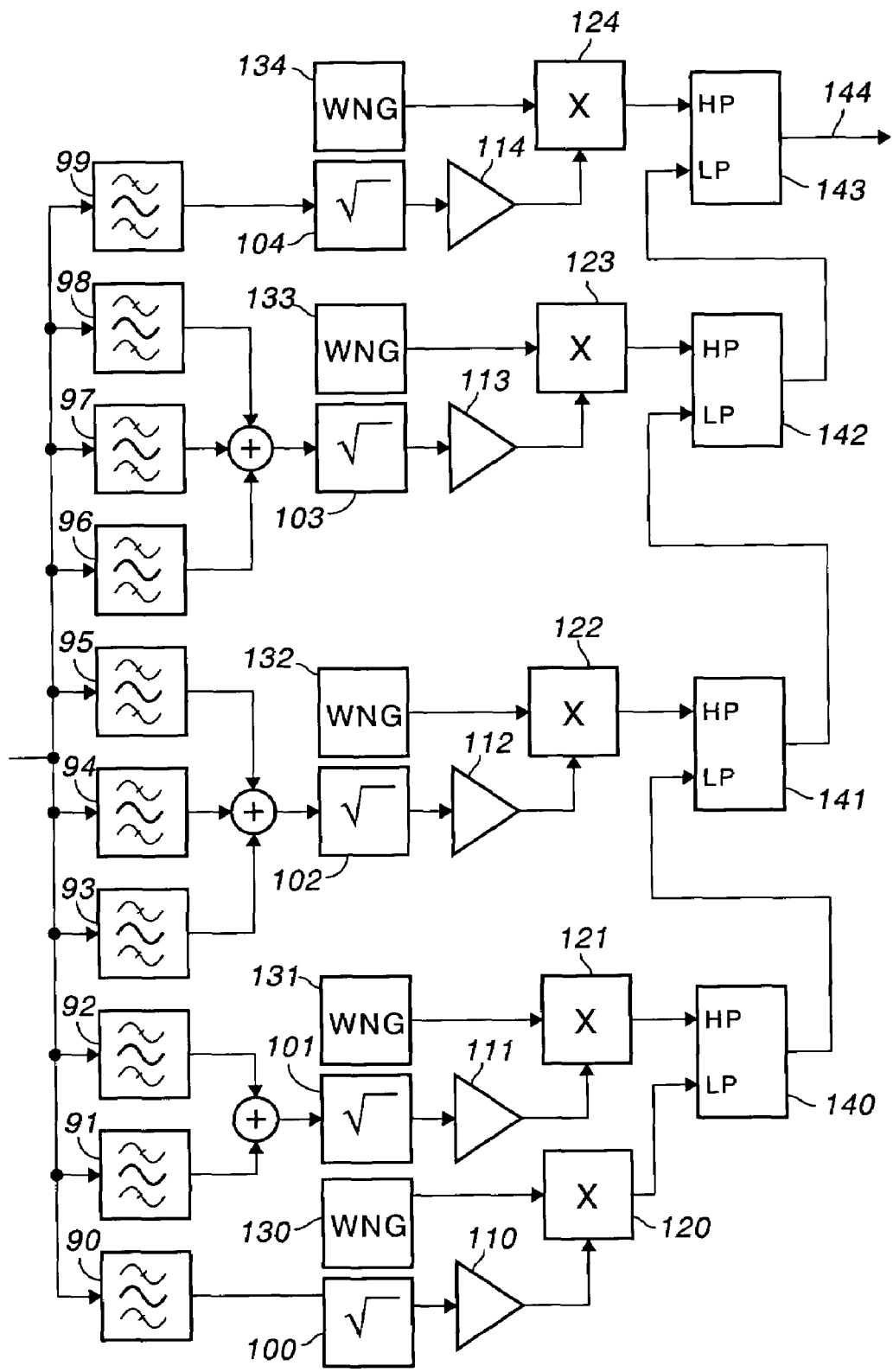
FIG. 8 is a block diagram of a comfort noise generator constructed in accordance with a preferred embodiment of the invention.

FIG. 8 illustrates a comfort noise generator constructed in accordance with a preferred embodiment of the invention. In the embodiment of FIG. 8, the outputs from ten analysis sub-band filters are used for generating scaling factors for sub-band comfort noise. The sub-band filters are in existing audio processing circuitry; see FIG. 5. A separate set of sub-band filters is not used for the invention to reduce cost and complexity. More or fewer sub-band filters could be used instead. Obviously, if existing circuitry does not include an analysis filter bank, then one must be provided.

As illustrated in FIG. 8, there are ten sub-band filters, 90-99, of progressively higher center frequency; i.e. sub-band filter 90 has the lowest center frequency and sub-band filter 99 has the highest center frequency. Although the particular frequency are not critical, the following example is representative of an effective frequency allocation. Many others could be used instead. Obviously, the range of frequencies is determined by application. In the example below, the range of frequencies is determined by the bandwidth of a telephone network.

| Analysis Band | Analysis Bandwidth (Hz) | QMF Band | QMF Bandwidth (Hz) |
|---|---|---|---|
| 0 | 102-242.5 | 0 | 0-250 |
| 1 | 283.6-352.1 | 1 | 250-500 |
| 2 | 370.3-456.9 | | |
| 3 | 480.4-594.6 | | |
| 4 | 625.3-773.1 | 2 | 500-1000 |
| 5 | 812.9-1005.9 | | |
| 6 | 1057.7-1309.5 | | |
| 7 | 1377-1706.2 | 3 | 1000-2000 |
| 8 | 1796.2-2233.9 | | |
| 9 | 2451-3395 | 4 | 2000-4000 |

The output from sub-band filter 90 is coupled to the square root circuitry 100. The outputs from sub-band filter 91 and sub-band filter 92 are added and coupled to the square root circuitry 101. The outputs from sub-band filter 93, sub-band filter 94, and sub-band filter 95 are added and coupled to square root circuitry 102. The outputs from sub-band filter 96, sub-band filter 97, and sub-band filter 98 are added and coupled to square root circuitry 103. The output from sub-band filter 99 is coupled to square root circuitry 104. While, in theory, one could use (n−1) polyphase filters with (n) sub-band filters, where $n \geq 2$, it is preferred to combine the outputs from several filters to reduce the number of polyphase filters and to bias comfort noise generation in favor of lower frequencies.

Square root circuit 100 feeds into amplifier 110, square root circuit 101 feeds 111, square root circuit 102 feeds amplifier 112, square root circuit 103 feeds amplifier 113, and square root circuit feeds amplifier 114. The incoming signals (data) represent power or, more accurately, mean squared values. The square root circuits provide the RMS (root mean squared) value of the signal for adjusting the gain of the white noise signal.

The output of amplifier 110 multiplies the output of white noise generator 130 through multiplier 120; the output of amplifier 111 multiplies the output of white noise generator 131 through multiplier 121; the output of amplifier 112 multiplies the output of white noise generator 132 through multiplier 122, the output of amplifier 113 multiplies the output of white noise generator 134 through multiplier 124.

The output of multiplier 120 is coupled to the low pass input QMF bank 140. The output of multiplier 121 is coupled to the high pass input of QMF bank 140. The output of QMF bank 140 is coupled to the low pass input of QMF bank 141. The output of multiplier 122 is coupled to the high pass input of QMF bank 141. The output of QMF bank 141 is coupled to the low pass input QMF bank 142. The output of multiplier 123 is coupled to the high pass input of QMF bank 142. The output of QMF bank 142 is coupled to the low pass input QMF bank 143. The output of multiplier 124 is coupled to the high pass input of QMF bank 143. The output of QMF bank 143 is the generated comfort noise.

The invention thus provides an improved generator of comfort noise in which the comfort noise more closely matches the spectral content of actual noise during a call. This is achieved by shaping white noise in a M channel quadrature mirror filter bank in accordance with the amplitude of the actual noise.

Having thus described the invention, it is understood by those of skill in the art that various modifications can be made within the scope of the invention. For example, as noted above, other forms of filter bank architectures can be used. In analog form, the blocks shown as multipliers are programmable gain amplifiers. In software, the operation is a multiplication of the two input digital values. Fewer separate white noise generators could be used, with a consequent decrease in randomness of the signals.

What is claimed as the invention is:

1. A method for providing a comfort noise signal in a telephone having a receive channel and a transmit channel and a plurality of sub-band filters in at least one channel, said method comprising the steps of:
    generating a white noise signal;
    applying the white noise signal to a QMF filter bank to produce a comfort noise signal, wherein the magnitude of the white noise into each QMF filter is controlled in accordance with the magnitude of the signal in a corresponding sub-band in the one channel; and
    selectively coupling the comfort noise signal to at least one of the channels.

2. The method as set forth in claim 1 wherein said applying step includes the steps of:
    coupling white noise signal through a first multiplier to the low pass input of the QMF bank;
    coupling white noise signal through a second multiplier to the high pass input of the QMF bank;

controlling the gain of the first multiplier in accordance with the magnitude of the signal in a first analysis sub-band;

controlling the gain of the second multiplier in accordance with the magnitude of the signal in a second analysis sub-band;

wherein the first sub-band has a lower frequency than the second sub-band.

3. The method as set forth in claim 2 and further including the steps of:

combining the output signals from two or more analysis sub-band filters to produce a combined signal; and controlling the gain of the second multiplier in accordance with the combined signal.

4. The method as set forth in claim 3 wherein the telephone includes n analysis sub-bands and there are no more than (n−1) QMF banks and further including the step of:

upwardly cascading the QMF banks to increase the low frequency resolution of the comfort noise signal.

5. The method as set forth in claim 3 wherein the telephone includes n analysis sub-bands and there are no more than (n−1) QMF banks and further including the step of:

combining the outputs from higher frequency sub-band filters to increase the low frequency resolution of the comfort noise signal.

6. In a cellular telephone having an antenna, an RE stage coupled to said antenna, and a signal processing circuit including an audio processor having a receive channel and a transmit channel and a plurality of analysis sub-band filters in at least one of the channels, said cellular telephone characterized by a comfort noise generator comprising:

a white noise generator;

at least one QMF bank producing a comfort noise signal, said QMF bank having a high pass input and a low pass input;

a first multiplier having a control input coupled to a first of said analysis sub-band filters;

a second multiplier having a control input coupled to a second of said analysis sub-band filters;

wherein the first multiplier couples said white noise generator to said low pass input and said second multiplier couples said white noise generator to said high pass input;

means for selectively coupling the comfort noise signal to at least one of the channels.

7. The cellular telephone as set forth in claim 6 and further comprising:

n analysis sub-band filters and no more than (n−1) QMF banks;

wherein the QMF banks are upwardly cascaded.

8. The cellular telephone as set forth in claim 6 and further including:

at least one summation circuit for coupling the outputs of more than one analysis sub-band filter to the control input of a multiplier.

9. The cellular telephone as set forth in claim 8 and further comprising:

n analysis sub-band filters and no more than (n−1) QMF banks;

wherein the QMF banks are upwardly cascaded.

10. The cellular telephone as set forth in claim 9 wherein the number of QMF banks is (n/2−1).

* * * * *